United States Patent
Khanolkar et al.

(10) Patent No.: US 7,127,743 B1
(45) Date of Patent: Oct. 24, 2006

(54) COMPREHENSIVE SECURITY STRUCTURE PLATFORM FOR NETWORK MANAGERS

(75) Inventors: Rajeev Khanolkar, Edison, NJ (US); Ozakil Azim, Piscataway, NJ (US); Rishi Asthana, Keasby, NJ (US); Niten Ved, Edison, NJ (US); Kevin Hanrahan, Benicia, CA (US); Amit Ghildiyal, Highland Park, NJ (US); Shirisha Pogaku, South Plainfield, NJ (US); Dhani Amaratunge, Edison, NJ (US); K. V. Rao Samavenkata, Edison, NJ (US); Aral-Rarsh Hamid, Edison, NJ (US)

(73) Assignee: Netforensics, Inc., Edison, NJ (US)

( * ) Notice: Subject to any disclaimer, the term of this patent is extended or adjusted under 35 U.S.C. 154(b) by 528 days.

(21) Appl. No.: 09/640,606

(22) Filed: Aug. 17, 2000

Related U.S. Application Data

(60) Provisional application No. 60/219,650, filed on Jul. 21, 2000, provisional application No. 60/213,967, filed on Jun. 23, 2000.

(51) Int. Cl.
  G06F 12/14 (2006.01)
  G06F 11/00 (2006.01)
(52) U.S. Cl. .................. 726/23; 709/223; 709/224; 726/1; 726/22
(58) Field of Classification Search ............... 713/201; 726/23, 22, 1; 709/223, 224
See application file for complete search history.

(56) References Cited

U.S. PATENT DOCUMENTS

| | | | |
|---|---|---|---|
| 5,414,833 A | | 5/1995 | Hershey et al. |
| 5,805,801 A | * | 9/1998 | Holloway et al. ............ 726/22 |
| 5,809,497 A | * | 9/1998 | Freund et al. ................. 707/2 |
| 5,958,012 A | * | 9/1999 | Battat et al. ................ 709/224 |

(Continued)

OTHER PUBLICATIONS

Kelly Jackson Higgins, "Security Strategies—a Welcome Intrusion—Network managers are taking advantage of the move by security companies to pack intrusion detection into a suite of managed services", InternetWeek. Manhasset: May 29, 2000., Iss. 815; p. 39.*

(Continued)

*Primary Examiner*—Taghi T. Arani
(74) *Attorney, Agent, or Firm*—DLA Piper Rudnick Gray Cary US LLP

(57) ABSTRACT

An embodiment includes a computer system for detecting and monitoring network intrusion events from log data received from network service devices in a computer network. An embodiment may include an event parser in communication with multiple network service devices. The event parser may parse information to create corresponding event objects concerning intrusion events. The system may include an event manager in communication with the event parser. The event manager may be configured to evaluate the event objects according to at least one predetermined threshold condition. The system may include an event broadcaster in communication with the event manager for receiving event objects designated by the event manager for broadcast. The event broadcaster may be able to transmit the event objects in real time. The system may also include means for alerting the user that a network intrusion event has occurred.

43 Claims, 12 Drawing Sheets

U.S. PATENT DOCUMENTS

| | | | | |
|---|---|---|---|---|
| 5,987,611 | A | * | 11/1999 | Freund .................... 713/201 |
| 6,070,244 | A | | 5/2000 | Orchier et al. |
| 6,088,804 | A | * | 7/2000 | Hill et al. .................. 713/201 |
| 6,119,236 | A | * | 9/2000 | Shipley ....................... 726/22 |
| 6,301,668 | B1 | * | 10/2001 | Gleichauf et al. .......... 713/201 |
| 6,324,647 | B1 | * | 11/2001 | Bowman-Amuah ......... 713/201 |
| 6,347,374 | B1 | * | 2/2002 | Drake et al. ................ 713/200 |
| 6,385,609 | B1 | * | 5/2002 | Barshefsky et al. ........... 707/6 |
| 6,405,318 | B1 | * | 6/2002 | Rowland .................... 713/200 |
| 6,453,345 | B1 | * | 9/2002 | Trcka et al. ................ 709/224 |
| 6,553,336 | B1 | * | 4/2003 | Johnson et al. ............. 702/188 |
| 6,839,850 | B1 | * | 1/2005 | Campbell et al. ............ 726/23 |
| 2002/0093527 | A1 | * | 7/2002 | Sherlock et al. ............ 345/736 |
| 2005/0185673 | A1 | * | 8/2005 | Campbell et al. ........... 370/468 |

OTHER PUBLICATIONS

Scott Blake, Protecting the network neighborhood, Security Management, Arlington: Apr. 2000, vol. 44, Iss. 4; p. 65, 5 pgs.*
Declaration of Rajeev Khanolkar with Exhibits A-E, dated Nov. 20, 2000.

* cited by examiner

Alert Messages, Severity 1
The following messages appear at severity 1, alerts:

%PIX-1-101001: (Primary) failover cable OK.
%PIX-1-101002: (Primary) Bad failover cable.
%PIX-1-101003: (Primary) failover cable not connected (this unit).
%PIX-1-101004: (Primary) failover cable not connected (other unit).
%PIX-1-101005: (Primary) Error reading failover cable status.
%PIX-1-102001: (Primary) Power failure/System reload other side.
%PIX-1-103001: (Primary) No response from other firewall.
%PIX-1-103002: (Primary) Other firewall network interface chars OK
%PIX-1-103003: (Primary) Other firewall network interface chars failed.
%PIX-1-103004: (Primary) Other firewall reports this firewall failed.
%PIX-1-103005: (Primary) Other firewall reporting failure.
%PIX-1-104001: Secondary: Switching to ACTIVE (cause: chars).
%PIX-1-104002: (Primary) Switching to STNDBY.
%PIX-1-104003: (Primary) Switching to FAILED.
%PIX-1-104004: (Primary) Switching to OK.
%PIX-1-105001: Disabling failover.
%PIX-1-105002: Enabling failover.
%PIX-1-105003: Monitoring on interface dec waiting.
%PIX-1-105004: Monitoring on interface dec normal.
%PIX-1-105005: Lost failover communications with mate on interface dec.
%PIX-1-105006: Link status 'Up' on interface dec.
%PIX-1-105007: Link status 'Down' on interface dec.
%PIX-1-105008: Testing interface dec.
%PIX-1-105009: Testing interface dec chars.
%PIX-1-105020: (chars) Incomplete/slow config replication
%PIX-1-302001: Built TCP connection for faddr IP_addr/ port gaddr IP_addr/ port laddr IP_addr/port (chars)
%PIX-1-709003: (chars) Beginning configuration replication: Send to mate.
%PIX-1-709004: (chars) End Configuration Replication (ACT)
%PIX-1-709005: (chars) Beginning configuration replication: Receiving from mate.

Critical Messages, Severity 2
The following messages appear at severity 2, critical:

%PIX-2-106001: Inbound TCP connection denied from IP_addr/port to IP_addr/ port flags chars
%PIX-2-106002: TCP Connection denied by outbound list dec src IP_addr/port dest IP_addr/port
%PIX-2-106003: Connection denied src IP_addr dest IP_addr due to JAVA Applet.
%PIX-2-106006: Deny inbound UDP from IP_addr/port to IP_addr/ port
%PIX-2-106007: Deny inbound UDP from IP_addr/ port to IP_addr/port due to DNS query/response.
%PIX-2-106008: Translation for IP_addr denied by outbound dec
%PIX-2-106009: Translation for IP_addr to IP_addr denied by outbound dec
%PIX-2-106012: Deny IP from IP_addr to IP_addr, IP options hex.
%PIX-2-106013: Dropping echo request from IP_addr to PAT address IP_Addr
%PIX-2-106014: Deny inbound icmp src interface name: IP_addr dst interface name: IP_addr (type dec, code dec)
%PIX-2-106015: Deny TCP (no connection) from IP_addr/port to IP_addr/ port flags.
%PIX-2-106016: Deny IP spoof from IP_addr to IP_addr, IP options hex.
%PIX-2-106017: Packet contains ActiveX content and has been modified src IP_addr dest to IP_addr, IP options hex.
%PIX-2-108001: SMTP made noop: out chars in chars data: chars
%PIX-2-108002: SMTP replaced chars: out chars in chars data: chars
%PIX-2-109009: Authorization denied from IP_addr/port to IP_addr/port (not authenticated)
%PIX-2-109011: Authen Session Start: user 'user', sid session_num
%PIX-2-110003: No interface is configured (with chars).
%PIX-2-112001: (chars:dec) PIX clear finished.
%PIX-2-199004: PIX clear config char from char.
%PIX-2-201003: Embryonic limit exceeded dec/dec for IP_addr/port (IP_addr)IP_addr/ port
%PIX-2-304006: URL Server went OFFLINE

Fig. 3a

Error Messages, Severity 3
The following messages appear at severity 3, errors:

%PIX-3-105010: host failover message block alloc failed
%PIX-3-106010: Deny inbound from outside:IP_addr to inside:IP_addr chars.
%PIX-3-109010: Auth from IP_addr/port to IP_addr/port failed (too many pending auths)
%PIX-3-109013: User must authenticate before using this service
%PIX-3-110002: No ARP for host IP_addr
%PIX-3-201001: Out of connections dec/ dec.
%PIX-3-201002: Too many connections on static IP_addr
%PIX-3-201005: FTP data connection failed for IP_addr.
%PIX-3-201006: RCMD back connection failed for IP_addr/port.
%PIX-3-201007: Unable to allocate new UDP connections (IP_addr/port-IP_addr/port)
%PIX-3-201008: The PIX is disallowing new connections.
%PIX-3-202001: Out of address translation slots!
%PIX-3-202002: Unable to find translation for incoming IP_addr.
%PIX-3-202002: Unable to find translation for SRC=IP_addr DEST=IP_addr IP octal inside|outside.
%PIX-3-202003: Could not build translation for IP_addr.
%PIX-3-202004: Could not build portmap translation for IP_addr.
%PIX-3-203001: ESP Error: No Key SPI hex SRC IP_addr DEST IP_addr
%PIX-3-208005: (chars:dec) pix clear return dec
%PIX-3-304003: URL Server IP_addr timed out URL string
%PIX-3-304004: URL Server IP_addr request failed URL chars
%PIX-3-304006: URL Server IP_addr not responding, trying IP_addr
%PIX-3-304007: URL Server IP_addr not responding, ENTERING ALLOW mode
%PIX-3-304008: Leaving ALLOW mode, URL Server IP_addr
%PIX-3-305005: No translation group found for protocol

Warning Messages, Severity 4
Currently, PIX Firewall does not generate severity 4, warning, Syslog messages.

Notification Messages, Severity 5
The following messages appear at severity 5, notifications:

%PIX-5-109012: Authen Session End: user 'user', sid session_num, elapsed num_seconds seconds
%PIX-5-111001: Begin configuration: chars writing to chars
%PIX-5-111002: Begin configuration: source reading from device
%PIX-5-111003: chars erase configuration
%PIX-5-111004: chars end configuration: FAILED|OK
%PIX-5-111005: chars end configuration: OK
%PIX-5-111006: Console login from chars at chars
%PIX-5-111007: Begin configuration: chars reading from chars.
%PIX-5-111008: User 'chars' executed the 'chars' command.
%PIX-5-199001: PIX reload command executed from IP_addr.
%PIX-5-304002: Access denied URL chars SRC IP_addr DEST IP_addr: chars

Fig. 3b

Informational Messages, Severity 6
The following messages appear at severity 6, informational:

%PIX-6-109001: Auth start for user 'chars' from IP_addr/port to IP_addr/port
%PIX-6-109002: Auth from IP_addr/port to IP_addr/port failed (server IP_addr failed)
%PIX-6-109003: Auth from IP_addr/port to IP_addr failed (server IP_addr failed)
%PIX-6-109005: Authentication succeeded for user 'chars' from IP_addr/port to IP_addr/port.
%PIX-6-109006: Authentication failed for user 'chars' from IP_addr/port to IP_addr/port.
%PIX-6-109007: Authorization permitted for user 'chars' from IP_addr/port to IP_addr/port.
%PIX-6-109008: Authorization denied for user 'chars' from IP_addr/port to IP_addr/port.
%PIX-6-302003: Built H245 connection for faddr IP_addr laddr IP_addr/port
%PIX-6-302004: Preallocate H323 UDP backconnection for faddr IP_addr to laddr IP_addr/port
%PIX-6-302005: Built UDP connection for faddr IP_addr/port gaddr IP_addr/port laddr IP_addr/port
%PIX-6-302006: Teardown UDP connection for faddr IP_addr/port gaddr IP_addr/port laddr IP_addr/port duration time bytes dec (chars)
%PIX-6-302009: Rebuilt TCP connection %d for faddr IP_addr/port gaddr IP_addr/port laddr IP_addr/port
%PIX-6-303002: IP_addr retrieved IP_addr:chars
%PIX-6-304001: IP_addr accessed IP_addr:chars.
%PIX-6-305001: Portmapped translation built for gaddr IP_addr/port laddr IP_addr/port (chars)
%PIX-6-305002: Translation built for gaddr IP_addr to IP_addr
%PIX-6-305003: Teardown translation for IP_addr (IP_addr)
%PIX-6-305004: Teardown portmap translation for global IP_addr/port local IP_addr/port
%PIX-6-305007: Orphan IP IP_addr on interface dec
%PIX-6-307001: Denied Telnet login session from IP_addr.
%PIX-6-307002: Permitted Telnet login session from IP_addr.
%PIX-6-307003: Telnet login session failed from IP_addr (3 attempts).
%PIX-6-308001: PIX console enable password incorrect for 3 tries from IP_addr.
%PIX-6-309001: Denied manager connection from IP_addr.
%PIX-6-309002: Permitted manager connection from IP_addr.

Debugging Messages, Severity 7
The following messages appear at severity 7, debugging:

%PIX-7-106011: Deny self route chars
%PIX-7-304005: URL Server IP_addr request pending URL chars
%PIX-7-305906: type translation creation failed for protocol
%PIX-7-701001: alloc_user() out of Tcp_user objects
%PIX-7-705001: (chars) Rep CI ioctl (chars) return chars
%PIX-7-709002: (chars) Rep no replication chars
%PIX-7-709008: (chars) End Configuration Replication (STB)

COMPREHENSIVE SECURITY STRUCTURE PLATFORM FOR NETWORK MANAGERS

CLAIM TO PRIORITY

This application claims the benefit of U.S. Provisional Application No. 60/213,967 filed on Jun. 23, 2000, and U.S. Provisional Application No. 60/219,650 filed on Jul. 21, 2000, the applications and their disclosures being incorporated herein by reference in their entirety for all purposes.

FIELD OF THE INVENTION

This invention relates generally to computer network security and more particularly to monitoring computer networks for network security events.

BACKGROUND OF THE INVENTION

With a trend toward ever larger computer communications networks, especially Internet-based networks, the number of access points for potential intruders in a given system likely increases. Password attacks, spoofing, network scanning and sniffing, denial of service (i.e., any activity preventing the normal operation of network resources), and TCP/IP (Transmission Control Protocol/Internet Protocol) attacks are only a few of the types of damaging intrusion techniques to which a network may be subject. To safeguard against attack, intrusion, and other security threats, network systems in a typical Internet infrastructure may include intrusion detection systems, firewalls, virtual private networks (VPN's), web servers, anti-virus servers, email servers, authentication (AAA) servers, proxy servers, and network vulnerability assessment devices, among other servers and devices. Because these systems themselves interact with sources outside the network, they also provide access points for an attack or intrusion upon a network.

Logging is the procedure by which operating systems record events in the system as they happen. Within the logging memory of these devices, and other devices such as web servers, e-mail servers, DNS servers, etc., logs are kept that contain data comprising information chronicling network intrusion events. Presented with log data, however, monitoring devices often fail in two respects. First, they fail to effectively monitor log data from all relevant components on the network. Second, they fail to record and report the log data in a form that is timely and useful to network administrators. Moreover, while various systems such as firewalls and intrusion detection systems, such as NetRanger from Cisco Systems, Inc., may issue real time alarms to a network administrator of an intrusion event based on log data, within a network such alarms may be lost in the midst of numerous notices of intrusion events received by a network administrator. What is needed is a system to process and organize network intrusion events and log data from a number of network systems and provide them to a user in an interface that summarizes them, yet has links to more detailed information, that provides for real time notice and communications regarding current events, and that allows for the compilation and recalling of past log data and intrusion events for detection of patterns of activity for later use and consultation.

SUMMARY OF THE INVENTION

An invention that satisfies those needs and provides other benefits that will be apparent to one skilled in the art has now been developed. Broadly, in one aspect the present invention concerns a security monitoring system for computer networks to analyze and report on network intrusion events taking place on network service devices using their log data. The word "intrusion" should be broadly understood to include any type of security breach and accidental or inadvertent misuse as well as an actual intrusion. Thus, it is to be understood that "network intrusion event," or "intrusion event," covers any type of network security event.

In response to an intrusion event, the security monitoring system can issue intrusion alarms to network administrative users ("users"), who will then be able to obtain information regarding intrusion events in real time on a display screen. The system filters log data, which contains information related to intrusion events, to provide a more manageable flow of data that can be more easily reviewed by a system administrator because the data relating to intrusion events are not "lost" in large amounts of noise (e.g., data not relating to intrusion events). The system has means for organizing and collating intrusion event data within a searchable database accessible to a user through a reporting system that can generate security reports and summaries of intrusion events for network service devices and that provides information in response to user queries.

The system has discrete software modules that receive and process log data from various network devices. Using Java programming language as a foundation, and utilizing relational database management systems (RDMS), log data chronicling network activity events received from various network devices are converted to event objects for processing and manipulation by the system. Event objects may contain information on the source device type, data and time of an intrusion event, host name (i.e., the particular device), alarm identification of the intrusion event from the network device, source Internet Protocol ("IP") address of the network device, source port of the network device, destination IP address (foreign IP address of intrusion source), destination port (port of intrusion source), protocol monitored (e.g., TCP, UDP, ICMP), and the intrusion event itself as recorded by that device. The user may set filters that regulate the type amount of log data received, limiting what passes the filter to only particular sources, particular event types, and/or particular protocols.

Each event object that is created is read, and the intrusion event information it contains is assigned a severity level. Event objects meeting or exceeding a predetermined threshold severity level, or other threshold criteria, may be broadcast to the user and displayed as an intrusion alarm on a user interface display screen in real time. Users may set filters regulating the stream of event objects received as broadcasts based on severity level or other criteria or may choose to receive all event objects regardless of severity or other criteria as broadcast intrusion alarms.

The user interface display screen displays broadcast intrusion alarms and provides access to the corresponding event object information via an alarm console. The alarm console is connected to a broadcast subsystem that includes modules enabling the user to connect to other users in a "chat" connection to inform other users in the network of real time intrusion alarms. From the report console, the user may receive summary reports of network security status and of event objects contained in the database. Using relational database connectivity systems, the database collates and organizes event objects received, allowing them to be recalled according to user queries input into the report console. The report console is linked to the database through a report subsystem, which provides a report servlet to access and transmit data for display from the database.

Another aspect of the invention is a distributed network of monitoring systems, each accessible to a central console for viewing broadcast intrusion alarms remote from the source computer system. The central console can also remotely search the individual databases of each monitoring system in the distributed network.

Another aspect of the invention is a method for detecting and monitoring network intrusion events from log data received from network service devices in a computer network using the system of this invention.

Other features and advantages of the present invention will be apparent to one skilled in the art from the following detailed description and drawings. As used herein, "in communication with" and "coupled" include direct and indirect (i.e., through an intermediate) communication and coupling.

BRIEF DESCRIPTION OF THE DRAWINGS

To facilitate further discussion of the invention, the following drawings are provided.

FIGS. 3a, 3b, and 3c contain a table illustrating network device intrusion events and assigned severity levels used by that computer system.

FIG. 8 is a representation of the user display screen of the computer system of FIGS. 1–4.

DETAILED DESCRIPTION OF THE INVENTION

Figure 1:
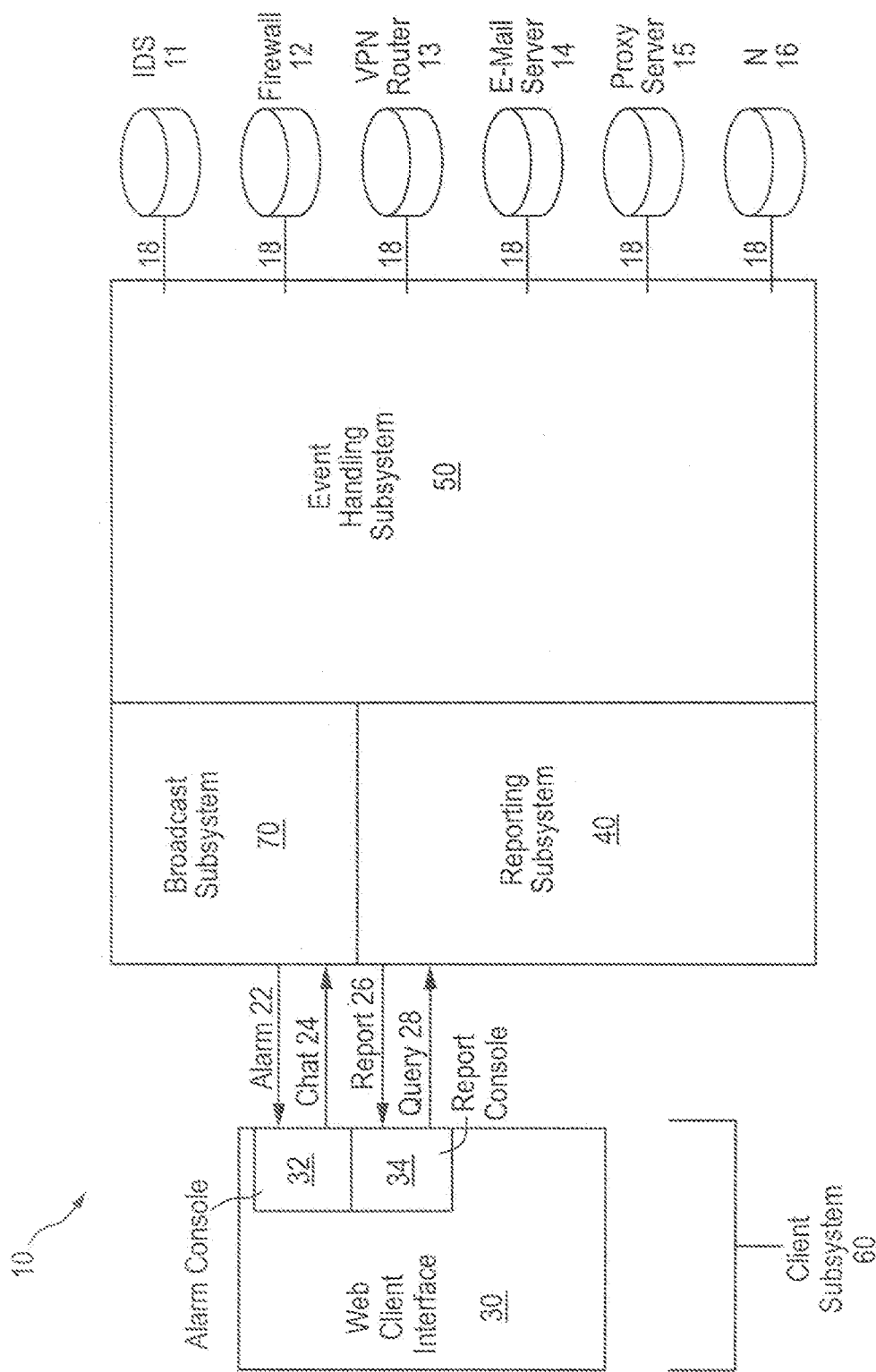
FIG. 1 is a block diagram showing an overview of the computer system of one embodiment of the invention.
Figure 2:
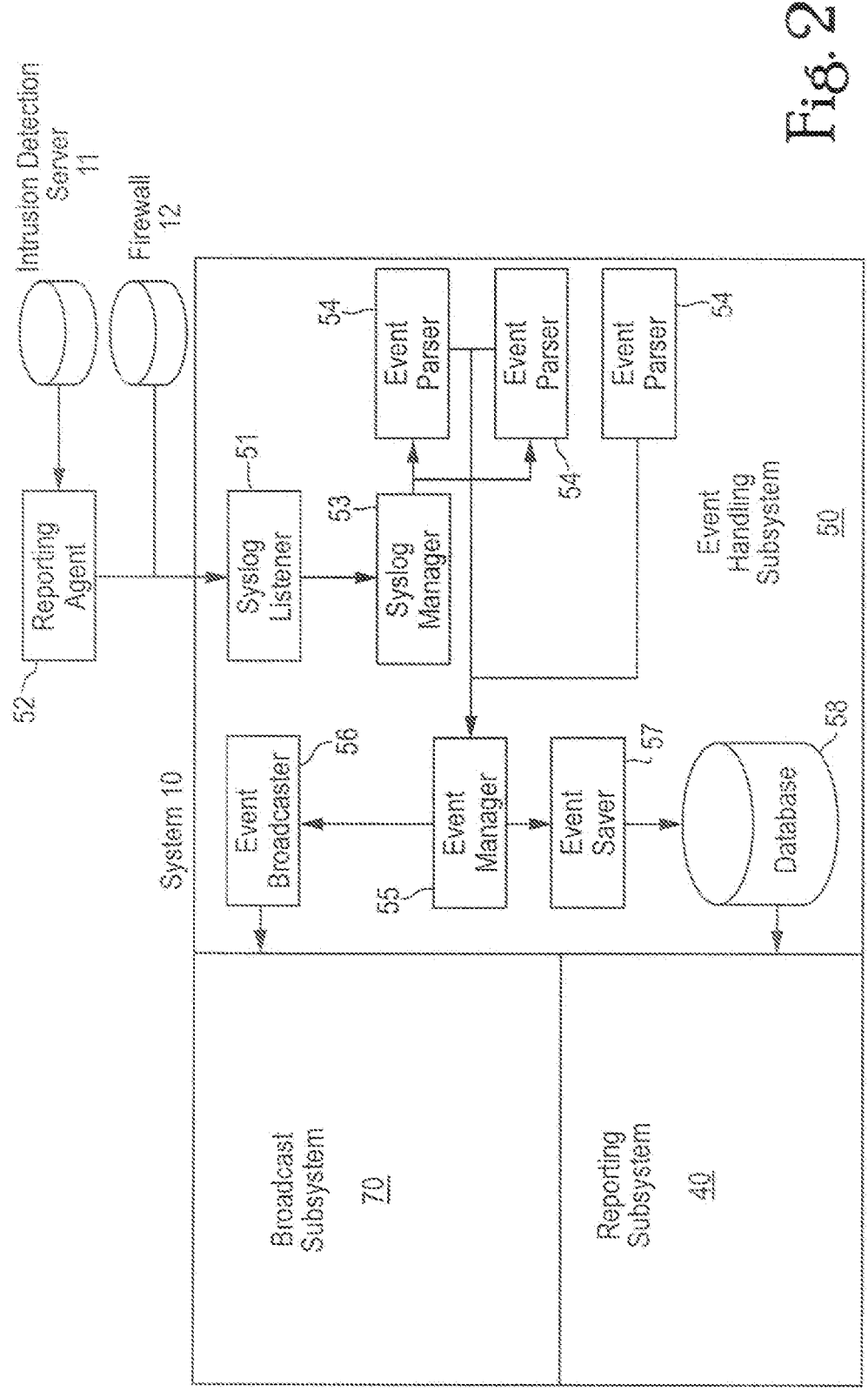
FIG. 2 is a block diagram of the architecture of the event handling subsystem.

In FIGS. 1 and 2, the security structure platform system of the present invention, hereafter system 10, comprises event handling subsystem 50, syslog listener 51, syslog manager 53, reporting agent 52, one or more event parsers 54, event manager 55, event broadcaster 56, event saver 57, database 58, web client subsystem 60, web client interface 30, alarm console 32, report console 34, reporting subsystem 40, report servlet 45, application reporter 48, broadcast subsystem 70, chat server 75, report 26, query 28, alarm 22, and chat 24.

In FIG. 1, system 10 receives log data 18 from multiple network service device sources, which sources may include firewalls, VPN (Virtual Private Network) routers/servers, e-mail servers, authentication servers, and other network devices that are accessible from sources outside the network, such as independent Internet Protocol ("IP") sources. For purposes of example, FIG. 1 identifies log data 18 from Intrusion Detection Server ("IDS") 11, Firewall 12, VPN Router/Server 13, E-mail server 14, Proxy Server 15, and "N" sources 16 ("N" represents other network devices). Although a plurality of different network service device sources are illustrated, the invention may monitor only one network service device or multiple network service devices of the same type, e.g., multiple firewalls. It will also be appreciated that other network service devices such as Web Servers, Anti-virus Servers, Calendar Servers, Directory Servers, DNS Servers, and Network Probes, among other devices in a computer network, may also provide log data to be processed.

System 10 is preferably a web-based platform, implemented on, for instance, Linux or Solaris server platforms, and is driven by web-interface browsers such as Netscape 4.x and Internet Explorer IE4.x. System 10 operates in conjunction with a web server, such as Apache or Netscape. Java Data Base Connectivity (JDBC) based connections are preferably used to retrieve data stored in various tables using a relational database management system ("RDMS"). The database (not pictured in FIG. 1) itself uses proprietary software (for instance Oracle 8.0) for its implementation.

Incoming log data 18, containing network intrusion information from the network devices, such as, for instance, event type, source IP, date and time of event, and firewall connection information, are received and processed within event handling subsystem 50. Event handling subsystem 50 parses log data 18, converting them into event objects that contain information regarding details of an intrusion event rendered in a standard format for processing and collating. Based on user-customizable, pre-determined criteria, the event handling subsystem may determine that the event object is of a sufficient severity to generate an alarm 22 to client subsystem 60, where it is displayed on web client interface 30 at alarm console 32. Alarm console 32 has a chat 24 electronic communications link, allowing the user to connect with other users on-line in the network, e.g., to determine status of an alarm event or to notify others of an alarm and the need for remedial action. Web client interface 30 may be a graphic user interface on a web browser having a display screen displaying the screens for both alarm console 32 and report console 34.

The screen for report console 34 on web client interface 30 may be displayed alongside the screen for alarm console 32 so that both screens can be consulted simultaneously by a user, e.g., a network security administrator or other network administrator. Report console 34 displays summaries and reports concerning network intrusions and may monitor specific network devices, 11–16, and summarize reports therefrom. Using report console 34, which operatively interacts with reporting subsystem 40, the user may compose and issue queries 28 for status, reports, and history, e.g., the user may issue a query on the status of a network device such as firewall 12, or the user may search the database (not pictured) for archived event objects based on, for instance, IP source, if the administrator notes a developing pattern of intrusion. Reports 26 of results from the query can be displayed on report console 34. Web client interface 30, alarm console 32, and report console 34 may, in some embodiments, be accessible to any user with access to system 10, for instance from a web browser, allowing a plurality of people to access and communicate back and forth with system 10.

FIG. 2 shows the application architecture of event handling subsystem 50. Modules of event handling subsystem 50 operate through threads launched by a software engine (not pictured) operating on the server platform. Data are received at a network port connection, which may be a 514/UDP (User Datagram Protocol) port. These threads run operations organized into classes generally identifying the operation to be performed. The system operates on a relational database format. Thus, program classes are organized and named to allow transfer and processing of data from other databases in the network devices. A common means of containing and transferring data, such as Java Beans, can provide the system of data exchange, and Java based Event Objects, in extended form, can provide the means for standardizing the log data for further processing in the system.

Inbound log data from the network devices 11–16 may be posted in a particular data format, such as syslog, extensible markup language ("xml"), or simple network management protocol ("snmp"), among others. Thus, in one embodiment, event handling subsystem 50 reads and processes syslog data and uses syslog daemons to forward data. Those reporting devices that post log data in syslog, for instance, firewall 12, forward log data directly to syslog listener 51 via a 514/UDP port (not pictured). Those devices that cannot post data via syslog have their log data processed by reporting agent 52, which reads the log and generates a syslog message reproducing the log lines read. Reporting agent 52 then sends the message to syslog listener 51. In one embodiment, event handling subsystem 50 is configured to generate multiple reporting agents 52 to read and forward messages from a plurality of reporting devices in the network, which devices may generate alternative formats for their log data. Alternatively, reporting agent 52 may have a multi-thread capability where each thread monitors a discrete reporting device.

Syslog listener 51 can be filtered according to the preference of the user. Filters may be activated through the web client interface 30 and may restrict receipt of log data based on, for instance, application name, host name, event severity, internal device alarm identifications, source address, destination address, destination port, and protocol.

After being received by syslog listener 51, log data containing syslog messages are detected, read, and serialized before streamed to syslog manager 53. Syslog manager 53 receives each message and matches the type of reporting device to the date, providing timestamps to the message and attaching informational strings. The syslog message is then streamed by syslog manager 53 to a specific event parser 54 configured to parse event objects from that particular type of reporting device. For instance, one parser may be configured to parse log data from an intrusion detection system such as NetRanger. Another parser may be configured for a Cisco PIX Firewall. Assignment to the correct event parser 54 may be done by matching the log data for the particular reporting device against application identifications present in the system among event parsers 54 stored within a class consulted by syslog manager 53. Using the application identification, a handle for the associated event parser for the particular device is retrieved. The syslog message is then streamed to the appropriate event parser 54.

While the foregoing embodiment illustrates operation of system 10 using syslog messages, it is to be understood that system 10 may also be configured to process messages that are in a format other than syslog, such as xml or snmp. Thus, modules such as syslog listener 51, reporting agent 52, and syslog manager 53, among other modules disclosed in the embodiment, may process messages in an alternative format.

Each event parser 54 contains threads for an abstract class launched for instances of log data from each reporting device of the type for which event parser 54 may be configured. Event parser 54 parses the syslog message to create an event object. In an extension of the Java.util Event Object class, the event object includes further information fields relevant to network security monitoring. For instance, once parsed, the created event object contains coded information, which may include the event type, application, reporting device, event time stamp, application time stamp, source IP of the event, destination IP of the event, and event duration, as well as any identification number that may be assigned by the reporting device to the event type. A user may also direct event parser 54 to filter out (i.e., reject) log data based on these fields of information, in which case event parser 54 will restrict receipt of filtered log data and not process them into an event object. As with syslog listener 51, event parser 54 filters can be set through web client interface 30.

Event parser 54 then streams the event object it has created to event manager 55. Event manager 55 processes the event object, evaluating it according to pre-determined criteria, which may be based on the type of the event, and assigns a severity level. Based on severity level, event manager 55 filters the event object, thereby determining accordingly whether the event object is to be broadcast and/or to be saved.

The levels of severity assigned may be as follows:

Alert Messages, Severity 1

Critical Messages, Severity 2

Error Messages, Severity 3

Warning Messages, Severity 4

Notification Messages, Severity 5

Informational Messages, Severity 6

Debugging Messages, Severity 7

Application of these severity levels for the Cisco PIX Firewall to certain event types is illustrated in FIGS. 3a, 3b, and 3c.

Severity filters within event manager 55 may be set by a user using configuration tables accessible through web client interface 30. Filtering within event manager 55 may also be based on the event type, i.e., certain event types would not be evaluated for severity level and/or broadcast. In event manager 55, as well as in other system modules and features, filter settings may be set by a user (for instance, a network administrator) through web client interface 30 (not pictured in FIG. 2) and loaded by the software engine upon startup of system 10. Settings may be modified by a user during system 10 operation by further input into web client interface 30. The software engine may be notified whenever the filters are modified and the filters may be reloaded by the software engine from a database. Upon input completion, settings are modified at the appropriate module or feature (for instance, at event manager 55, syslog listener 51, and/or event parser 54) by the software engine. Consequently, where no filter is activated, all event objects received by event manager 55 will be broadcast, regardless of severity and/or event type. Where the filter is activated, event manager 55 can be directed not to forward for broadcast any event objects having, for example, a severity level of one. Filters may also be set depending on the identification numbers assigned to the particular event type by the specific network device. Identification numbers pertaining to event types may also be filtered at syslog listener 51 or event parser 54, i.e., prior to the creation of the event object.

As with the filters available for activation at syslog listener 51 and/or event parser 54, event manager 55 may filter based on other criteria and threshold levels that may be set by the user as a broadcast threshold, including source IP address, source port, destination IP address, and destination port. When these filters are in place, only those event objects having the permitted source ports, destination ports, or IP addresses will be broadcast to alarm console 32 for real time viewing. If an event object is to be streamed for broadcast (i.e., meets any applicable threshold level or criteria) event manager 55 streams the event object to event broadcaster 56, which may occupy a TCP port and listen for an event object stream thereon. Event objects may also be saved to database 58 by streaming them from event manager 55 to event saver 57.

One advantage of the present system over prior monitor systems is that event manager 55 receives the event object before it is stored in a database. Therefore, the determination of whether to broadcast the event object as an intrusion alarm is made nearly instantaneously upon receipt of the event object. That the event object need not be collected first, retrieved from a database, and only then examined to determine whether to broadcast an alarm allows the intrusion alarm to be broadcast in real time and without delay.

Event saver 57 is a thread launched for each event object to be saved to database 58. Using a class for database access, event saver 57 contacts database 58 and saves the event object. In database 58, the event object is archived and organized according to its particular information for later retrieval or matching with patterns or signatures. Database 58 may be one of many commercially available database systems, for example, Oracle 8.0. Event broadcaster 56 receives event objects to be broadcast to the web client interface 30 or more specifically to alarm console 32 of the interface. Event broadcaster 56 establishes and maintains a communications connection with alarm console 32, for instance, a TCP pipe, to stream the event object for display as an intrusion alarm.

Figure 4:
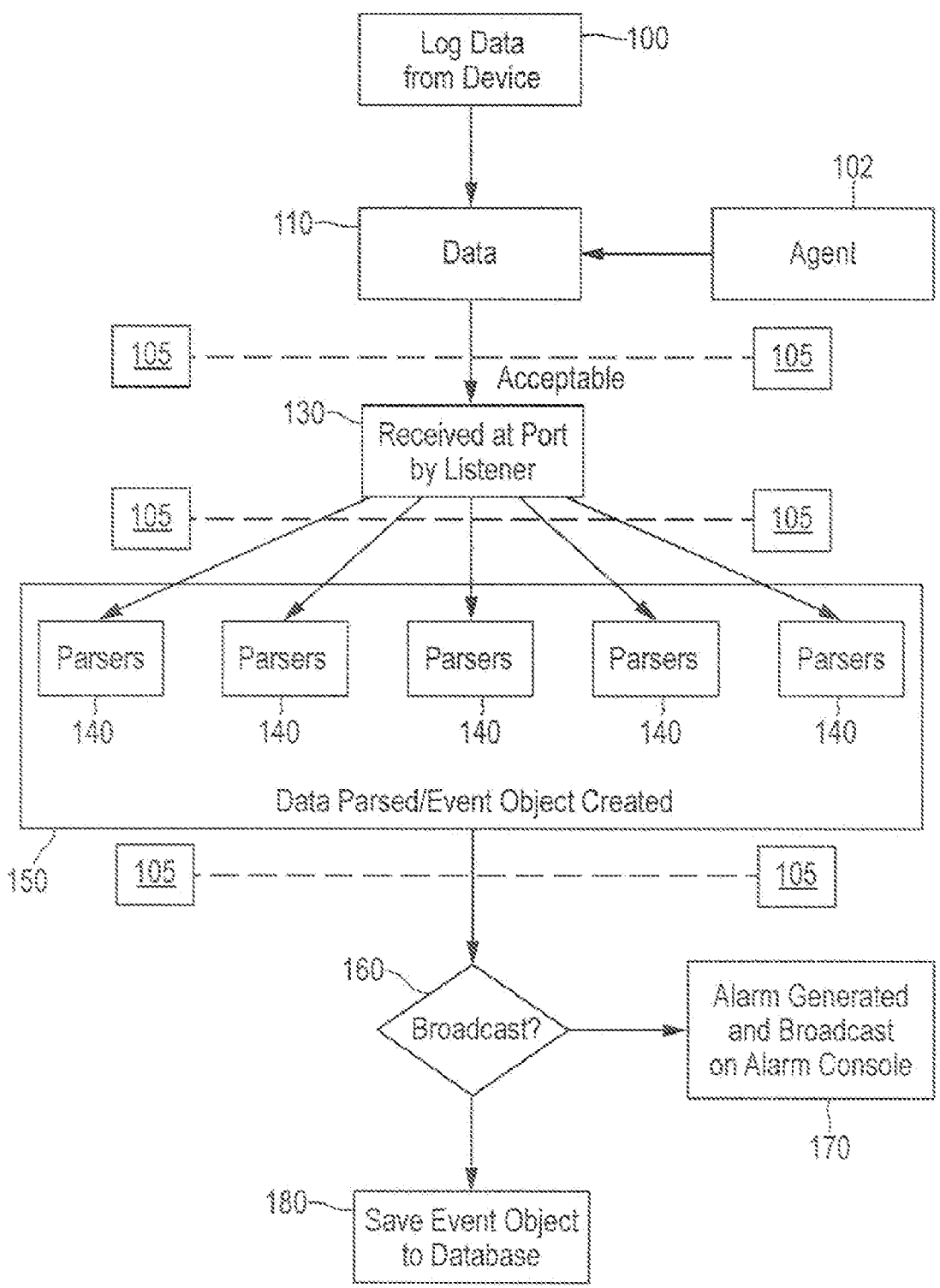
FIG. 4 is a flow chart depicting the operation of the event handling subsystem of that computer system.

In FIG. 4, inbound log data from a device source are provided at function block 100. Functional block 110 represents conforming inbound log data 100 (for instance, in the exemplary embodiment log data messages posted in syslog would conform) and/or non-conforming log data retrieved by an agent 102 activated to read the log data and provide a syslog message format, or other conforming format, for them. At block 130 syslog listener receives the log data and directs them to one of a plurality of event parsers that is provided for the particular device source at block 140. At block 150 event parsers 140 read the log data and parse the information contained therein into a particular form, for instance, an event object, for further processing. At this stage, an assigned severity level based on event type and other information pertaining to an intrusion event may be included in the created event object. The event object proceeds to the event manager via decision block 160. If the event object is of a sufficiently high level of severity or meets other threshold criteria, it is forwarded as a generated alarm 170 to the alarm console for broadcast. The broadcast step 170 may be accomplished over a TCP pipe to the alarm console.

At step 160, event objects may be designated for broadcast as alarms based on threshold criteria other than severity, e.g., event objects pertaining to a specified event such as a cable failure, which may be based on filter settings applied at step 160 within the event manager or on filters 105, which may restrict receipt of event objects at step 160. Threshold severity levels, and other threshold criteria, may be set by a user or a default mode retained. It is also contemplated that a user may set no threshold criteria or threshold level and allow the generation of alarms and broadcast of all event objects received at 160.

Event objects of all severity levels, unless directed otherwise, are forwarded via block 180 to event saver for saving to the database (not pictured). Alarms received by the event broadcaster 170 are processed and sent as intrusion alarms to the alarm console. Filters 105, which can be set by a user, may restrict receipt of log data or broadcast of event objects at various stages of the system, based on certain criteria such as event type or severity level.

Figure 5:
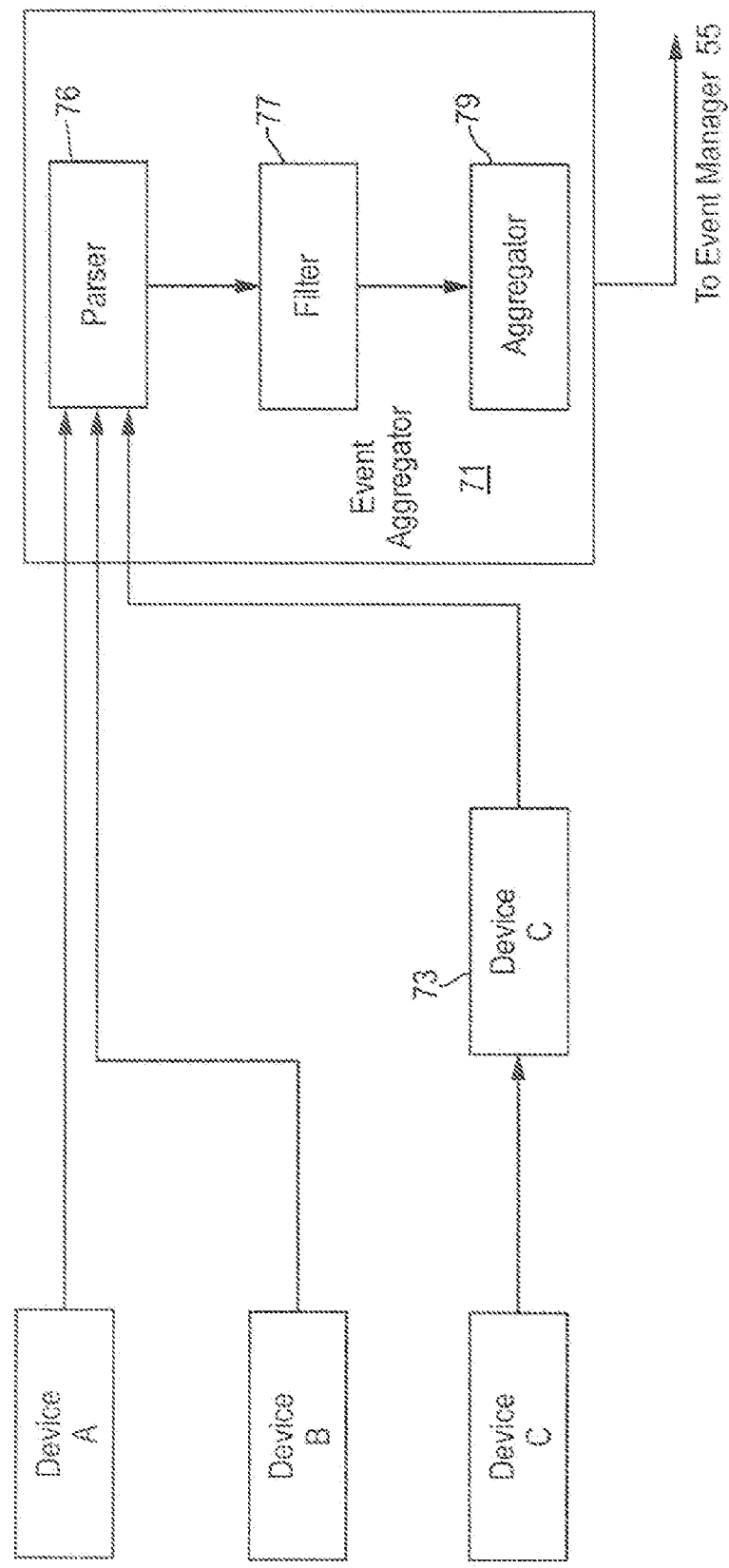
FIG. 5 is a block diagram of an alternative embodiment of a portion of the event handling subsystem.

FIG. 5 shows an alternative embodiment of the invention in which log data from security devices are received and parsed by a single event parser 76 embodied within an event aggregator 71. This embodiment uses a generic (standard) message format, e.g., extensible markup language (xml), thus eliminating the need for separate event parsers. Security devices that send data in xml are received directly by the event aggregator 71. Reporting agent 73 may be used for devices that cannot post data in an xml or other standard format (e.g., syslog format). The agent establishes a connection with the event aggregator 71, downloads the appropriate parser from it, parses the security event information in the log, and sends an xml representation of the security event to event aggregator 71 for filtering.

Event aggregator 71 comprises a generic event parser 76, which parses log data received and creates event objects. Filter 77 contained within the event aggregator filters security event objects based on event type and severity filtering criteria (among other programmable criteria). An aggregator 79 then aggregates the events, eliminating or combining redundant events where necessary to reduce volume, and forwards the created event objects to the event manager 55 for further processing.

Figure 6:
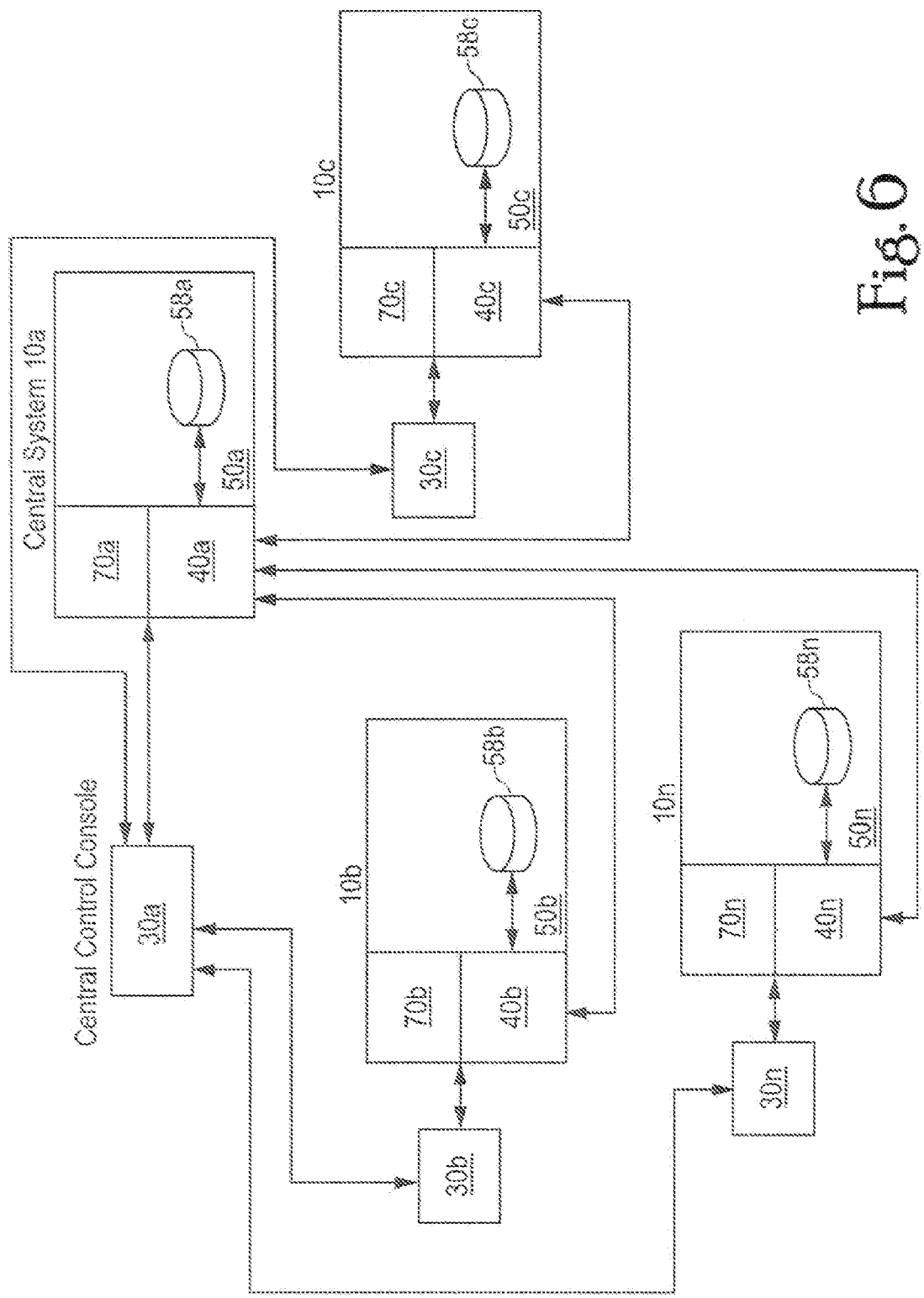
FIG. 6 is a block diagram of a distributed network of the computer system of FIGS. 1–4.

In FIG. 6 a plurality of network systems 10a, 10b, 10c, . . . ,10n (subscript "n" indicates the "nth" system) are in operation and in communication with a central operations interface (e.g., console) 30a in addition to local operations consoles 30b, 30c, . . . , and 30n. From central operations console 30a, a user can access event objects stored in databases 58a, 58b, 58c, . . . , and 58n of the various systems though the reporting subsystems 40b, 40c, . . . , 40n as well as central reporting system 40a. Central operations console 10a can issue commands and queries to all other consoles 10b, 10c, . . . , and 10n to be received by local users.

Figure 7:
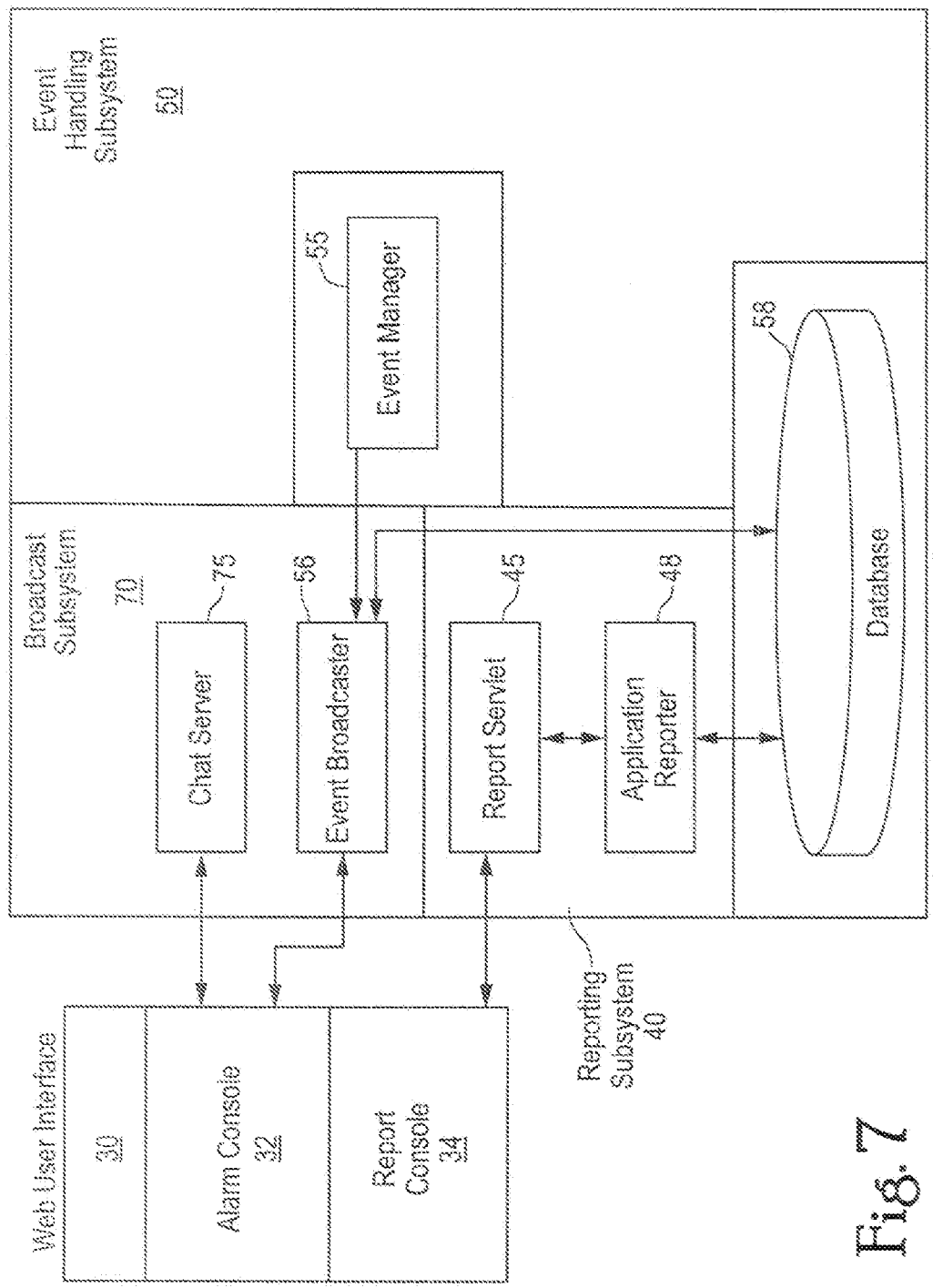
FIG. 7 is a block diagram of the client side architecture of the computer system of FIGS. 1–4.

FIG. 7 illustrates the client side of the system architecture. Web user interface 30 displays both alarm console 32 and report console 34. In one embodiment, consoles 32 and 34 are displayed on a single web browser screen that may be manipulated as necessary by the user according to the operations software used, e.g., MS Windows. In one embodiment, alarm console 32 is a Java applet program loaded on the client browser. Alarm console 32 is responsible for real time event display, real time device status display, alarm display, and chat communications. Alarm console 32 is connected to broadcast subsystem 70 and the modules constituting the subsystem. Chat server 75 establishes a communications link over secure sockets to enable web user interface 30 to link with other web user interfaces so as to communicate with other web client users, for instance regarding an alarm event.

Event broadcaster 56 forwards intrusion alarms to alarm console 32, along with accompanying event object information. Intrusion alarm event objects are displayed on a real time device status panel appearing on console 32 showing the status of devices configured for the user. An illustration of this screen appears as FIG. 8. On web client interface 30, the user can set display filters restricting the event objects viewed on alarm console 32 without setting system wide filters (i.e., within the modules of the subsystems). For instance, users can filter out display of event objects from particular devices or filter out display of event objects pertaining to particular event types so that each user may focus on particular devices and/or events types in the network. Thus, a user may filter broadcast event objects without filtering out event objects received by event manager 55, thereby allowing unviewed event objects to be saved to database 58 or to be broadcast to other possible users on web client interface 30 accessing the same system. User settings for display filters may be stored in a database.

Color codes for the various devices, indicating levels of severity and other data information, may appear in a scrolled listing. Alarms appear on alarm console 32 through a Java applet window, scrolling as they are received in summary line form and in real time. These summary lines not only represent event objects identified for broadcast, but each summary line is also a hypertext link to further information contained in the event object. Selecting (or clicking) on a line allows the user to drill down to further graphic framesets revealing more information regarding the event.

Figure 8:
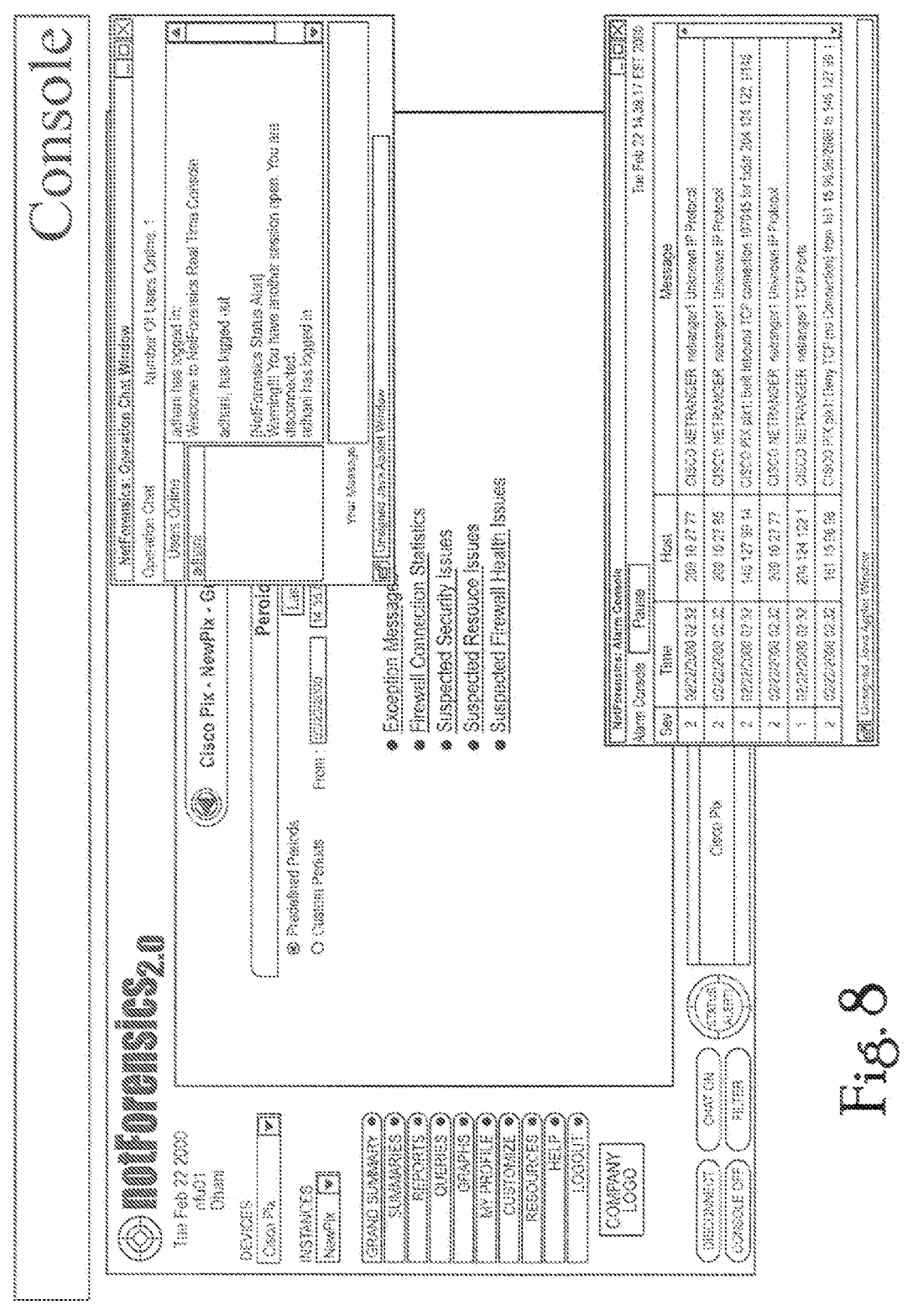

Alarm console 32 also allows real time communications with other users through a connection to chat server 75, opening a java applet window where messages may be composed and sent to other operators on-line. Additionally, chat server 75 also shows which other users may also be on-line at the time and their names. This is illustrated in FIG. 8 (see the Operator Chat Window).

Figure 9:
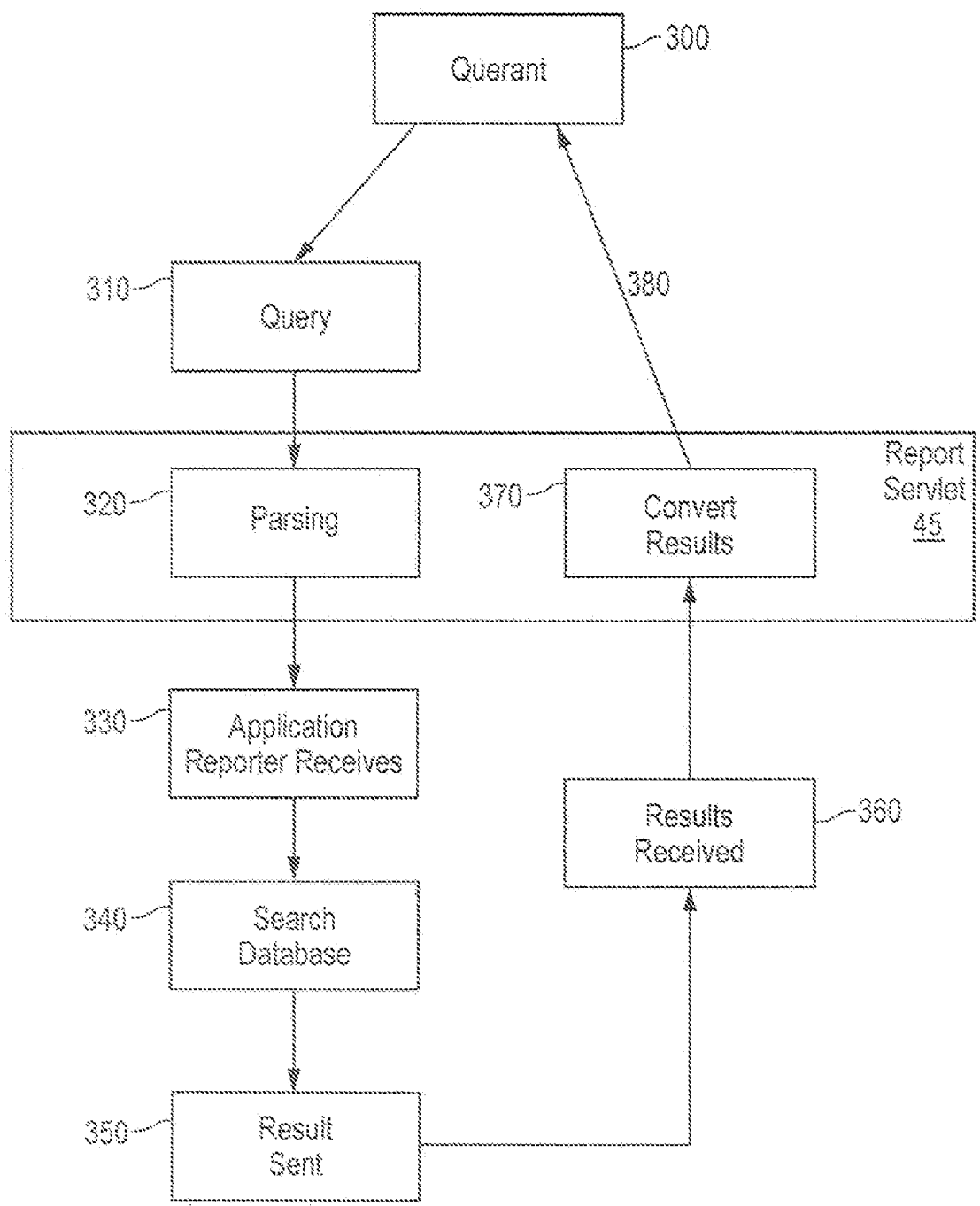
FIG. 9 is a flow chart of the operation of the query function of the computer system of FIGS. 1–4.

As shown in FIG. 7, report console 34 can access the reporting subsystem 40. Reporting subsystem 40 is accessed using a Hypertext Transfer Protocol ("HTTP") communication connection from the web browser in web user interface 30. Custom queries for event object searches may be input to reporting subsystem 40 by the user. These queries are received and processed by report servlet 45, which is responsible for returning results of the query after initiating a search of database 58 conducted through application reporter 48. Commonly used queries can also be input by selecting them from a query menu. The following table illustrates some sample queries from a query menu for the Cisco PIX Firewall application:

List Messages for a Period
Connection Query by Source and Destination IP
Denied Outbound Connection Query by Source and Destination IP
Denied Inbound Connection Query by Source and Destination IP
Authorization Query by User
Alarm ID Query FIG. 9 illustrates the processing of a query by report servlet 45. Upon initiation by querant 300, report servlet 45 opens a connection to application reporter (not pictured in FIG. 9). An input query 310 from querant 300 is received and parsed (block 320) to identify various elements or criteria sought, such as application type, report name, or other criteria. The parsed elements are forwarded to the application reporter (block 330), which initiates a search of the database (block 340). A result set is generated from the database (block 350), which is returned to report servlet (block 360). Preferably, the database result set is in xml format. Report servlet 45 converts xml result data to hypertext markup language ("HTML") (block 370) and the results are returned to the querant 300 (arrow 380) for display on the report console.

Figure 10:
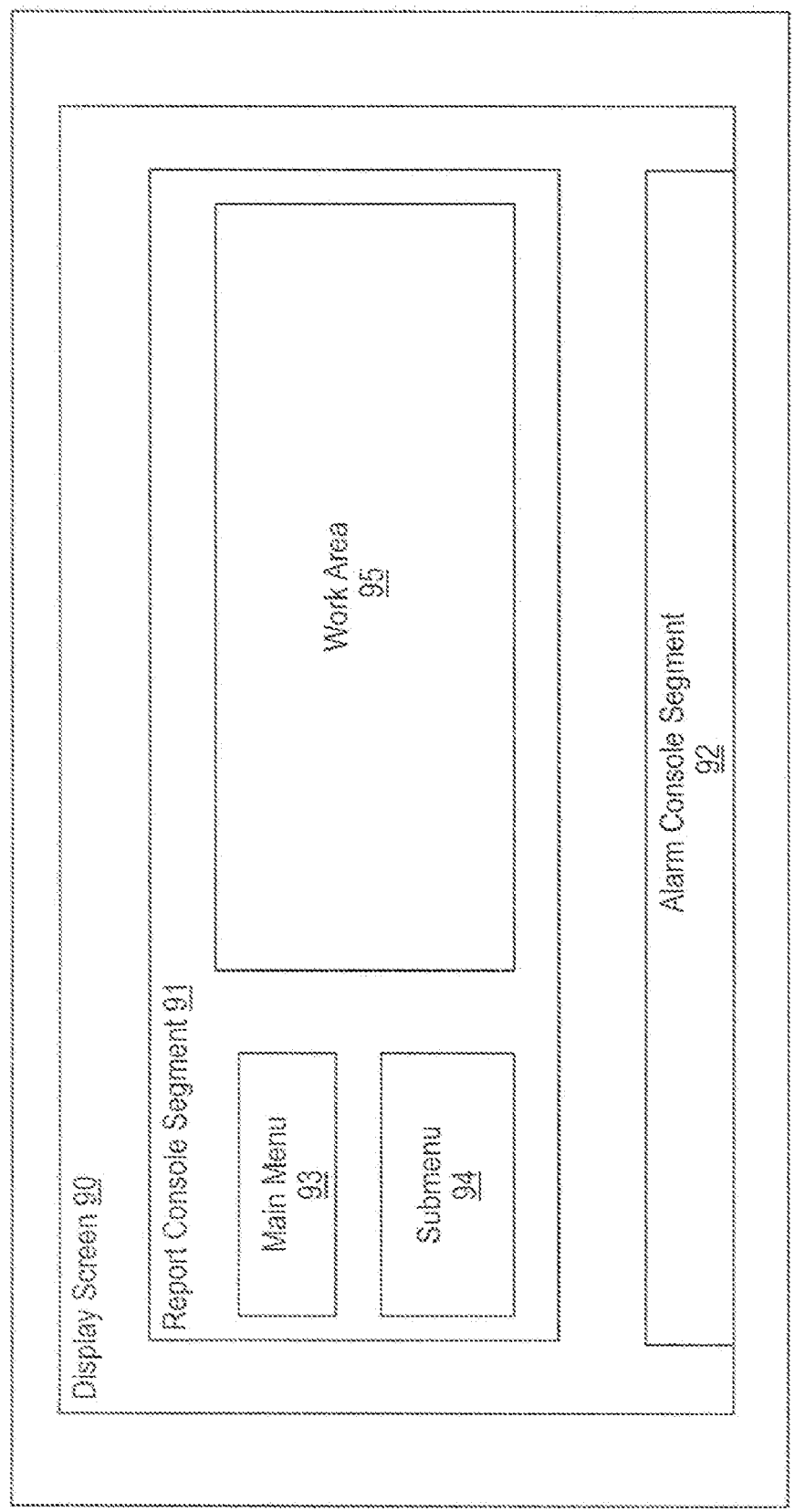
FIG. 10 is a block diagram of the user display screen of the computer system of FIGS. 1–4.

FIG. 10 illustrates one graphical user interface for use as the web client interface 30. Other configurations and formats will be apparent to those skilled in the art. Display screen 90 is separated into two sections, report console segment 91 and alarm console segment 92. Report console segment 91 features a main menu section 93, which displays the first two levels of the application in folder tree fashion, these being the application type, i.e., the type of device being monitored, and instances, i.e., the specific device. Submenu 94 provides a frame to display options for viewing the data where reports, summaries, and graphs may be displayed, as well as an area where queries and query results may be input. Optionally, user access to various filters in the system may be provided through Submenu 94, or filter access may be provided otherwise on the graphical user interface. This frame may also provide an area for requesting "help." Work area 95 can be used to list the various types of reports, summaries, and queries for each application type and display report summaries, query results, graphs, and online help. Alarm console segment 92 may be continuously displayed at the bottom of the screen with features allowing access to information concerning any security event or alarm issued by the system. Alarm console segment 92 may also be restored to work area 95 for ease of display.

Although the invention has been described in relation to specific embodiments, other variations and modifications will become apparent to those skilled in the art and the claims are intended to cover all embodiments falling within the true spirit and scope of the invention.

We claim:

1. A computer system for detecting and monitoring network intrusion events from log data received from network service devices in a computer network, the computer system having discrete modules associated with a function performed on the log data received, the computer system comprising:

an event parser in communication with multiple network service devices, wherein the network service devices comprise a firewall, VPN (virtual private network) server or router, an e-mail server, or any combination of two or more thereof, the event parser being able to receive log data in real time from the device, the log data including information detailing a network intrusion event received from the network service device if an intrusion has occurred, the event parser being able to parse the information to create corresponding event objects concerning the intrusion events, wherein an event object comprises information fields relevant to network security monitoring including at least information regarding a reporting device and a time stamp;

an event manager in communication with the event parser, the event manager being able to receive the event objects, the event manager being configured to evaluate the event objects according to at least one predetermined threshold condition such that, when the event objects satisfy the predetermined threshold condition, the event manager designates the event objects to be broadcast in real time;

an event broadcaster in communication with the event manager for receiving event objects designated by the event manager for broadcast, the event broadcaster being able to transmit the event objects in real time, relative to the receipt of the log data, as an intrusion alarm; and means for alerting a user that a network intrusion event has occurred.

2. The computer system of claim 1 wherein the means for alerting the user that a network intrusion event has occurred is a graphical user interface in communication with the event broadcaster, the graphical user interface comprising a display screen for displaying an intrusion alarm and the information contained within the corresponding event object received from the event broadcaster.

3. The computer system of claim 2 wherein the graphical user interface display screen comprises an alarm console, coupled to the event broadcaster, configured to display intrusion alarms, and a report console, coupled to the report servlet, configured to execute queries input by a user and display results, wherein the alarm console and event broadcaster are displayed simultaneously on the display screen.

4. The computer system of claim 3 wherein the graphical user interface displays the status of network security devices in real time.

5. The computer system of claim 4 wherein the graphical user interface displays the status of network security devices in summary lines, said summary lines comprising hypertext links providing access to further data.

6. The computer system of claim 5 wherein the graphical user interface displays the status of network security devices in a color coded format where said color designates a particular status level for the particular device.

7. The computer system of claim 3 further comprising a chat manager accessible to a user from the alarm console for executing electronic communications links between the user and others having an electronic communications link to the computer system.

8. The computer system of claim 7 wherein the electronic communications link is an on-line link established through a web browser interface.

9. The computer system of claim 1 wherein the information contained within the event object is read by the event manager and assigned a severity level corresponding to the event type information contained within the event object, and the predetermined threshold condition is the assigned severity level.

10. The computer system of claim 9 wherein the severity level is one of seven categories for types of events contained within event objects.

11. The computer system of claim 1 further comprising an event aggregator module and wherein the event parser is housed within the event aggregator module, and log data from a multiplicity of network device sources is received by the event parser.

12. The computer system of claim 11 wherein the event parser reads log data posted in extensible markup language.

13. The computer system of claim 3 wherein the report console is further configured to display query result data in summary lines, said summary lines comprising hypertext links providing access to further data.

14. The computer system of claim 3 wherein the alarm console displays intrusion alarms in summary lines, said summary lines comprising hypertext links providing access to further data.

15. The computer system of claim 1 further comprising a plurality of event parsers wherein each event parser is configured to receive log data from a predetermined network service device, the plurality of parsers each coupled to the event manager.

16. The computer system of claim 2 wherein the graphic user interface is configured to allow a user to initiate queries, and the computer system further comprises:
  means for storing event objects, said means coupled to the event parsers;
  a report servlet coupled to the graphic user interface, the report servlet for recalling stored event objects in response to user queries from the graphic user interface and displaying recalled event objects on the graphic user interface display screen;
  an application reporter coupled to the report servlet for receiving and processing user queries and for performing searches of stored event objects; and
  a database accessible by the application reporter, for holding stored event objects, the database configured to recall event objects in response to searches executed by the application reporter.

17. The computer system of claim 16 wherein the computer system is one of a multiplicity of computer systems each having a graphic user interface and the computer system further comprises a central graphic user interface which accesses at least one of the graphic user interfaces of the multiplicity of computer systems.

18. The computer system of claim 17 wherein the central graphic user interface accesses at least one of the report servlets of the multiplicity of computer systems and communicates with at least one of the databases of the multiplicity of computer systems.

19. The computer system of claim 1 further comprising:
  a network port to receive log data having a conforming message format from at least one network service device;
  means for transmitting the log data having a conforming message format to the event parsers, said means coupled to the network port; and
  a reporting agent coupled to the network port for collecting log data having a non-conforming message format from the at least one network service device and converting the log data to a conforming message format.

20. The computer system of claim 19 further comprising means for filtering log data received at the network port according to one or more predetermined conditions so as to restrict receipt of corresponding log data by said transmitting means.

21. The computer system of claim 20 wherein the predetermined conditions are application name, host name, internal device alarm identifications, source address, destination address, destination port, and protocol.

22. The computer system of claim 19 wherein the conforming message format is syslog.

23. The computer system of claim 1 further comprising means for filtering event objects received by the event manager according to one or more predetermined conditions so as to restrict the field of event objects designated for broadcast.

24. The computer system of claim 23 wherein the predetermined conditions are application name, host name, event severity, internal device alarm identifications, source address, destination address, destination port, and protocol.

25. The method of claim 1, wherein the event object comprises an application.

26. The method of claim 1, wherein the event object comprises an event time stamp.

27. The method of claim 1, wherein the event object comprises an application time stamp.

28. The method of claim 1, wherein the event object comprises an address associated with the event.

29. The method of claim 1, wherein the address comprises a source IP address of the event.

30. The method of claim 1, wherein the event object comprises an event duration.

31. The method of claim 1, wherein the event object comprises an identification number assigned by the reporting device.

32. A method for detecting and monitoring network intrusion events from log data received from network service devices in a computer network comprising the steps of:
- receiving log data in real time, the log data including information detailing at least one network intrusion event received from the network service devices, wherein the network service devices comprise a firewall, VPN (virtual private network) server or router, an e-mail server, or any combination of two or more thereof;
- parsing the log data information to create corresponding event objects, wherein an event object comprises information fields relevant to network security monitoring including at least information regarding a reporting device and a time stamp; and
- evaluating the event objects according to at least one predetermined threshold condition;
- where the information contained within the event objects satisfies the predetermined threshold condition, broadcasting the event object as an intrusion alarm in real time, relative to the receipt of the log data, to a display screen on a graphic user interface.

33. The method of claim 32 wherein the graphic user interface is configured to allow a user to initiate queries, and the method further comprises the steps of:
- storing event objects to a database accessible by an application reporter, the database for holding stored event objects, and the database configured to recall event objects in response to searches performed by the application reporter in response to user queries; and
- recalling stored event objects in response to user queries from the graphic user interface and displaying recalled event objects on the graphic user interface display screen.

34. The method of claim 33 further comprising the steps of:
- receiving log data in a conforming message format at a network port;
- transmitting the log data in a conforming message format to event parsers;
- collecting log data in a non-conforming message format by executing a reporting agent; and
- converting the log data to a conforming message format.

35. The method of claim 34 wherein the conforming message format is syslog.

36. The method of claim 33 wherein the stored event object is displayed as a hypertext link to further event object information and the method further comprises using a display screen interface device to open the hypertext link to reveal further event object information on at least one successive display screen frameset.

37. The method of claim 32 further comprising the step of filtering log data received according to one or more predetermined conditions so as to restrict the receipt of corresponding log data.

38. The method of claim 37 wherein the predetermined conditions are application name, host name, internal device alarm identifications, source address, destination address, destination port, and protocol.

39. The method of claim 32 further comprising the step of opening an electronic communications link to other users on the computer system.

40. The method of claim 39 further comprising the step of sending an electronic message over the communications link to other users regarding an intrusion alarm.

41. The method of claim 32 wherein the event object intrusion alarm is displayed as a hypertext link to further event object information and the method further comprises using a display screen interface device to open the hypertext link to reveal further event object information on at least one successive display screen frameset.

42. A computer system for detecting and monitoring network intrusion events from log data received from network service devices in a computer network, the computer system having discrete modules associated with a function performed on the log data received, the computer system comprising:
- an event parser in communication with multiple network service devices, wherein the network service devices comprise a firewall, VPN (virtual private network) server or router, an e-mail server, or any combination of two or more thereof, the event parser being able to receive log data in real time from the devices, the log data including information detailing a network intrusion event received from the network service devices if an intrusion has occurred, the event parser being able to parse the information to create corresponding event objects concerning the intrusion events, wherein an event object comprises information fields relevant to network security monitoring including at least information regarding a reporting device and a time stamp;
- an event aggregator, the event aggregator being able to filter the event objects based on event type and severity;
- an event manager in communication with the event aggregator, the event manager being able to receive the event object, the event manager being configured to evaluate the event object according to at least one predetermined threshold condition such that, when the event object satisfies the predetermined threshold condition, the event manager designates the event object to be broadcast in real time;
- an event broadcaster in communication with the event manager for receiving event objects designated by the event manager for broadcast, the event broadcaster being able to transmit the event object in real time, relative to the receipt of the log data, as an intrusion alarm; and
- means for alerting a user that a network intrusion event has occurred.

43. A method for detecting and monitoring network intrusion events from log data received from network service devices in a computer network, wherein the network service devices comprise a firewall, VPN (virtual private network) server or router, an e-mail server, or any combination of two or more thereof, comprising the steps of:
- receiving log data in real time from multiple network security devices, the log data including information detailing at least network intrusion events received from the network service devices;
- parsing the log data information to create corresponding event objects, wherein an event object comprises information fields relevant to network security monitoring including at least information regarding a reporting device and a time stamp;
- filtering the event objects based on event type and severity; and
- evaluating the event objects according to at least one predetermined threshold condition;
- where the information contained within an event object satisfies the predetermined threshold condition, broadcasting the event object as an intrusion alarm in real time, relative to the receipt of the log data, to a display screen on a graphic user interface.

* * * * *

UNITED STATES PATENT AND TRADEMARK OFFICE
CERTIFICATE OF CORRECTION

PATENT NO.       : 7,127,743 B1
APPLICATION NO. : 09/640606
DATED            : October 24, 2006
INVENTOR(S)      : Khanolkar et al.

It is certified that error appears in the above-identified patent and that said Letters Patent is hereby corrected as shown below:

On The Title Page:
Item (75), the tenth inventor's name reading "--Aral-Rarsh HAMID--" should be changed to --Araf Karsh Hamid--.

Signed and Sealed this

Second Day of January, 2007

JON W. DUDAS
*Director of the United States Patent and Trademark Office*